Oct. 20, 1936.  M. J. NEELEY  2,057,965
VEHICLE LAMP
Filed May 31, 1935
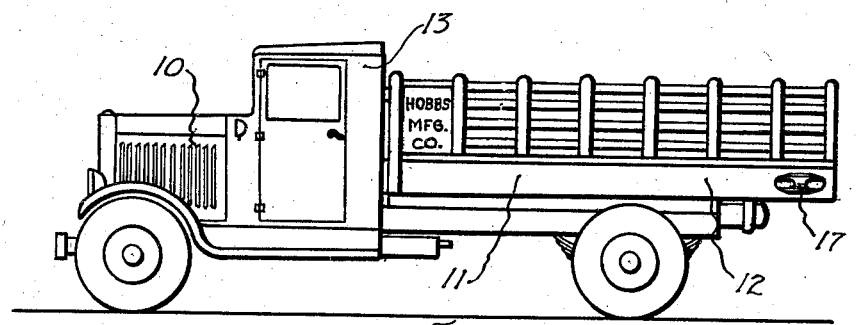
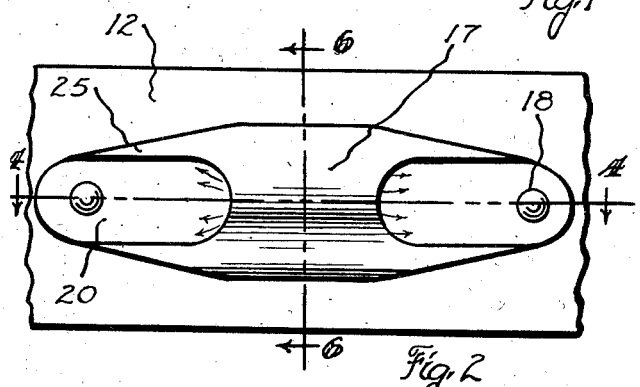
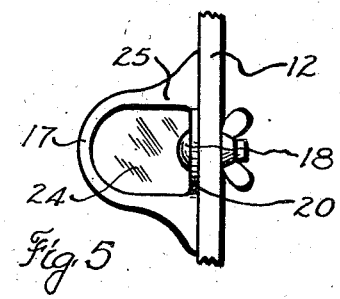
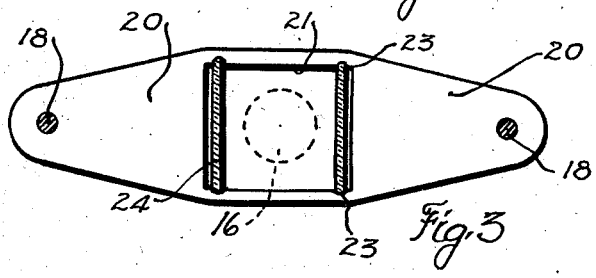
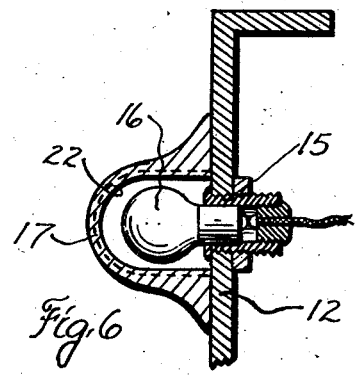
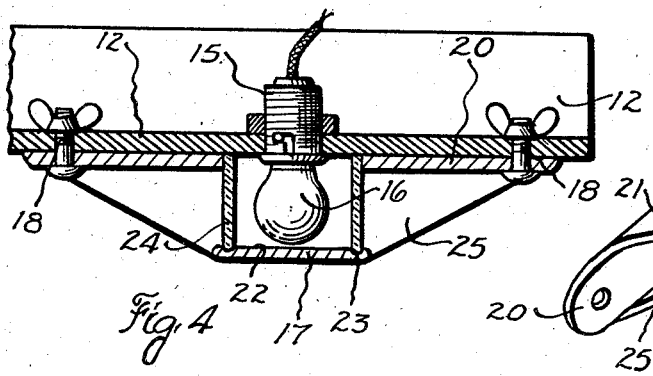
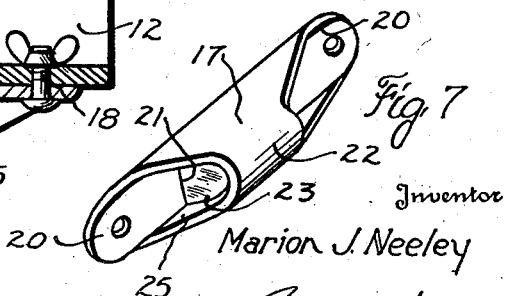
Inventor
Marion J. Neeley
By Jack S. Ashley
Attorney Patented Oct. 20, 1936

2,057,965

UNITED STATES PATENT OFFICE 2,057,965

VEHICLE LAMP

Marion J. Neeley, Fort Worth, Tex.

Application May 31, 1935, Serial No. 24,269

1 Claim. (Cl. 240—8.2)

This invention relates to new and useful improvements in vehicle lamps.

One object of the invention is to provide an improved vehicle lamp which is particularly adapted to be secured to the side of a motor truck, trailer, or other vehicle and which will effectively serve as a "clearance light" to inform other motorists of the road space necessary for the passage of such vehicle.

An important object of the invention is to provide a vehicle lamp adapted to be used as a clearance light for motor vehicles which is so arranged that a light of one color is visible to a driver approaching the front of the vehicle, while a light of a contrasting color is visible to a driver approaching the rear thereof, the lamp casing being such that the reflections from both the contrasting lights are visible from the side at substantially a right angle thereto.

Another object of the invention is to provide an improved lamp casing for a vehicle lamp which is constructed of comparatively heavy material, whereby it serves as a guard when attached to the side of a motor vehicle, said casing also being so formed that objects striking the same tend to slide off the same thereby reducing the danger of said casing being knocked off said vehicle.

A further object of the invention is to provide a vehicle lamp for motor vehicles which is directly attached to the side of the body of said vehicle, instead of suspended on a bracket as is the usual practice, whereby vibration of said light is reduced to a minimum which increases the life of said lamp.

Still another object of the invention is to provide an improved vehicle lamp including a lamp socket which is mounted within the body of the motor vehicle, whereby only the lamp which is covered by a suitable casing projects outwardly from the side of the vehicle; thus if the lamp casing and lamp are struck by another vehicle and knocked off, the socket remains undamaged.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a side elevation of a motor truck, having a vehicle lamp constructed in accordance with the invention, mounted thereon, Figure 2 is an elevation of the lamp, Figure 3 is a view, similar to Figure 2, and showing the side opposite to that shown in Figure 2, Figure 4 is a longitudinal sectional view, taken on the line 4—4 of Figure 2, Figure 5 is an end elevation, Figure 6 is a transverse, vertical sectional view, taken on the line 6—6 of Figure 2, and Figure 7 is an isometrical view, of the lamp casing.

In the drawing, the numeral 10 designates a motor truck which is provided with the usual bed 11 at its rear. The type of bed illustrated has upwardly extending side walls 12. In most trucks these side walls project beyond the sides of the truck cab 13, and in all cases are, at least in alinement therewith. Therefore, it is essential that the sides of the bed be provided with clearance lights so that drivers approaching the vehicle from either front or rear will be informed as to the width of the bed.

The usual practice has been to mount a light, similar to the usual tail light of an automobile, on a bracket extending outwardly from the sides of the bed. This has been found to be very unsatisfactory because of the vibration which quickly breaks the filament in the electric lamp and also because the brackets are being constantly bent or broken.

In carrying out the invention, an electric lamp socket 15 is embedded in the side wall of the truck in any suitable way, so that its outer edge is flush with the outer face of said wall. The usual electric lamp 16 is then mounted in the socket in the usual way and by observing Figure 6, it will be seen that the lamp extends beyond the side wall of the bed. The socket is preferably mounted near the rear end of the truck bed although this is not essential and it may be mounted at any point therealong.

For protecting and covering the lamp 16, as well as to produce the desired lighting, an elongated lamp casing 17 is provided. The casing is preferably constructed of metal, or other suitable material and is fastened to the wall 12 of the bed by bolts 18. As clearly shown in Figs. 1 and 2, the casing completely covers and protects the lamp 16.

The casing comprises a base plate 20 which is formed with a rectangular opening 21 at its central portion through which the lamp 16 extends when the plate is secured to the truck bed. A U-shaped hood 22 extends over the opening 21 and the lamp 16 and is preferably made integral with the base plate. The hood is open at each end, whereby the rays of the electric lamp are visible from the ends of the casing. The hood is provided with internal grooves 23 at each end thereof and these grooves receive transparent panels 24, which when slid within the grooves close the ends of said hood. The panels may be made of a composition of celluloid, glass or other suitable material and are colored, the panel at the forward end of the hood being of one color, while the panel at the rear end of the hood is of a contrasting color. For purposes of illustration, the forward panel will be assumed to be green, while the rear panel will be red, but it is pointed out that the colors of the panels will vary to comply with the laws of the various states. Thus, it is obvious that the light rays shining from the electric lamp must pass through the panels and due to the coloring of said panels, a driver approaching the motor truck 10 will see only the green light, while a driver approaching the rear of said truck will see only the red clearance light.

Inclined webs 25 extend from the upper and lower portions of the hood to the outer ends of the base plate 20. These webs incline inwardly from the outer face of the hood to the plate (Figure 4) and are preferably made integral with the plate and hood. The webs not only serve to strengthen the casing but it is obvious that should another vehicle, or any obstruction, strike said casing, the inclination of the webs would tend to cause the same to slide off or slip therefrom. Thus, possibility of the casing being knocked off the truck bed is practically eliminated. Since the casing is made of metal or other substantially strong material, said casing serves as a bumper guard for the sides of the truck. It is pointed out that the rounded outer hood also prevents objects which might fall downwardly thereon during loading or unloading of the truck bed, from knocking said casing loose because said rounded portion sheds such objects, its action being similar to the inclined webs 25.

The casing 18 does not project very far from side of the truck bed, the hood being only of sufficient size to cover the lamp 16. This further reduces the danger of the casing being dislodged or knocked from its fastenings. It is obvious that the green light is visible only from the front of the truck while the red light is visible only from the rear. When approaching the truck at an intersection, that is, at right angles thereto, the reflections of both green and red lights are visible. This is true because the webs 25 serve to retain the light rays to a certain extent. Because of the visibility of the reflections when approaching the truck from the side, it is desirable to mount the casing and lamp at the rear of the bed 11, but as pointed out this is not essential. In the event that the casing 17 is torn from the bed, either by its striking an obstruction or by a passing vehicle, it will be seen that the lamp 16 would also be broken. However, the lamp socket 15, being embedded in the wall 12, would be undamaged and it would merely be necessary to replace the lamp and casing. The only way the socket could be damaged would be to smash the truck bed.

It is further pointed out that since the socket lamp and casing are firmly attached to the bed, rather than suspended on a bracket, the vibration of the lamp is reduced to a minimum thereby increasing the life of said lamp. Although, the invention is shown and described as attached to a truck bed, it is to be clearly understood that it may be used with any vehicle, or in any other suitable place.

What I claim and desire to secure by Letters Patent is:

A lamp for a vehicle having substantially thick side walls including, an electric socket embedded in said side wall with its end flush therewith, an electric lamp in said socket, a lamp casing including a base plate arranged to be secured to the wall and having an opening for permitting said lamp to project therethrough and also having a U-shaped hood integral with the plate, said hood extending over the lamp and having each end open, whereby the light is visible from either the front or rear of said vehicle when the lamp is lighted, said hood having grooves at its ends, various colored panels within the grooves closing each end of the hood so that a light of one color is visible when approaching the front of the vehicle while a different colored light is visible when approaching the rear of the machine, the ends of the hood and base plate being connected by inclined webs at the top and bottom of the plate whereby the lamp casing is reinforced and also whereby the reflections of the various colored lights are retained between said webs so as to be visible when approaching the vehicle from the side.

MARION J. NEELEY.